Figure 1:
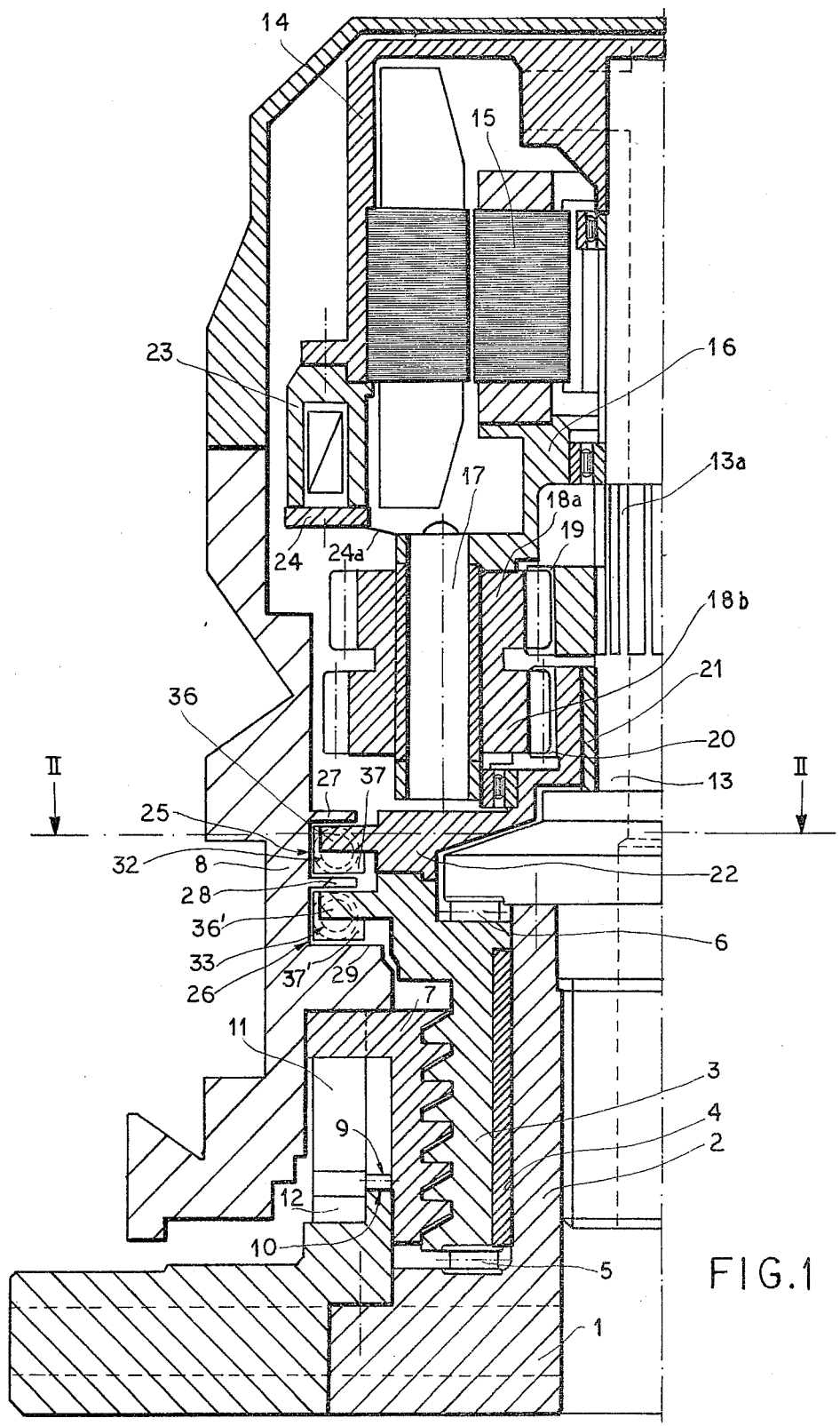

United States Patent [19]
Zaninelli

[11] 4,244,247
[45] Jan. 13, 1981

[54] TURRET WITH ELASTIC-ACTION DEVICE FOR THE POSITIONING OF THE TOOL-CARRYING BODY

[75] Inventor: Ettore Zaninelli, Milan, Italy

[73] Assignee: Baruffaldi Frizioni S.p.A., Milan, Italy

[21] Appl. No.: 4,986

[22] Filed: Jan. 19, 1979

[30] Foreign Application Priority Data

Jan. 23, 1978 [IT] Italy ............................... 19521 A/78

[51] Int. Cl.³ .................... B23B 29/00; B23B 29/24
[52] U.S. Cl. .................... 82/36 A; 74/813 L; 74/822; 74/826
[58] Field of Search .................. 82/36 R, 36 A, 36 B; 74/813 R, 813 L, 822, 826, 816

[56] References Cited
U.S. PATENT DOCUMENTS

| | | | |
|---|---|---|---|
| 3,675,519 | 7/1972 | McCullough | 82/36 A |
| 3,760,655 | 9/1973 | Buchmeier | 74/826 |
| 3,905,257 | 9/1975 | Thumm et al. | 82/36 A |
| 4,038,891 | 8/1977 | Zaninelli | 82/36 A |
| 4,151,759 | 5/1979 | Buchmeier | 74/816 |

*Primary Examiner*—Harrison L. Hinson
*Attorney, Agent, or Firm*—Karl F. Ross

[57] ABSTRACT

An automatic turret for a lathe and the like comprises a fixed base, a control screw mounted to be rotatable and axially non-displaceable, a nut connected to a tool-carrying body, two basic toothed crowns and at least one latch for arresting the tool-carrying body. The turret has a central column supporting a hollow-rotor motor at its upper end and said control screw at the lower end thereof, an epicyclic reduction gear associated with said motor and having an initial end toothed wheel fixed to said column and a second end wheel, rotatable on said column, and connected to said control screw, a positioning device of the tool-carrying body comprising at least one annular guiding recess provided on the inner cylindrical surface of the body itself, co-axial with the axis of the turret and interrupted on its circumference at at least one point by at least one notch or radial tooth, the said annular recess also being provided with at least one tooth or the like projecting radially from the control screw, and at least one pre-loaded spring interposed so as to penetrate within said annular recess between the tooth projecting from the screw and one flank of the notch or radial tooth present in the recess. The tooth of the screw travels an angular path within said recess of the tool-carrying body corresponding to the axial movement for the disengagement of the body from the base in which path the said spring is partially unloaded. After disengagement, the body is rotated directly by the tooth of the screw until reaching the new working position; at least one latch or the like, slides on guides and is adapted to penetrate into recesses formed in the base so as to arrest the tool-carrying body when it has reached the new position, this arrest remaining stable during the reversal of the rotation of the screw adapted to lower the tool-carrying body until the basic toothed crowns are locked and the spring inserted in the guide recess is restressed. The stability of locking of the screw is ensured by an electro-magnetic brake acting directly on the motor.

8 Claims, 2 Drawing Figures

TURRET WITH ELASTIC-ACTION DEVICE FOR THE POSITIONING OF THE TOOL-CARRYING BODY

The present invention concerns an improved tool-carrying turret using elastically yielding means for the automatic positioning of the tool-carrier body during the feed movements of said body in passing from one working position to the next.

Such turrets support tools on a parallelepipedal body or by means of a disc or the like, which tools are intended to execute specific processes at successive intervals effected automatically. The movements effected automatically by such turrets may be listed generally as follows: (a) rotation of a part of the turret for the disengagement of the tool-carrying body from a fixed base; (b) rotation of the tool-carrying body, after said disengagement, for passing to a subsequent working position; (c) positioning of the tool-carrying body to the new position, and (d) reversal of the rotation for locking the tool carrier to the base in the new working position of said tool carrier. These movements, as is well known, are effected by an electric motor (controlled by suitable selectors with contacts and rotating brushes) which actuates a screw which is able to rotate without being axially displaced; the screw rotates a nut connected to the tool-carrying body whereby the latter may be released from its engagement with the fixed base. This engagement is generally formed by two opposite toothed crowns, one of which is connected to the fixed base and the other to the lower part of the tool-carrying body. Hence, by the rotation of the screw, the tool carrier is raised and disengaged from the base and may thus be rotated and moved to the new working position where it is positioned when subsequently returned (after reversal of the direction of movement of the motor and the screw) into engagement with the fixed base after the meshing of said toothed crowns. For the positioning of the tool-carrying body after its disengagement from the base, various means and devices have already been proposed which connect the screw to the nut in such a manner that the latter, connected to the body, is able to rotate the former through a certain angle until it reaches the new position. The positioning devices which have hitherto been used comprise, in some cases, rings with projecting teeth arranged so as to penetrate, after assuming a given angular position, into recesses formed in another ring connected to the screw. In other cases, studs or taper pins are used in opposition to thrust springs and associated with the tool-carrying body and adapted to engage in recesses provided in the fixed base of the turret after reaching a certain angle of rotation of said body. In general, the known devices are complicated, bulky constructions and often involve limitations in the speed of rotation of the parts and, in particular, of the tool-carrying body when passing from one working position to the next. All these disadvantages and limitations are surmounted or minimized by the tool-carrying turret of the present invention, said turret being improved so as to permit better exploitation of the interval space, to offer a high range of uses and guarantee reliable operation. Also reliability is ensured by the presence of an electro-magnetic brake which guards against the possible disengagement of the control screw during working operations of the tools which might be caused by the vibrations produced in the turret.

The improved turret according to the present invention is of the "revolver" type and comprises a fixed base, a motor, a rotatable screw which is axially non-displaceable, a nut or like threaded member connected to a tool-carrying body, two basic toothed crowns and at least one latch for arresting the tool-carrying body; the improvement comprises a central column supporting a hollow-rotor motor at its upper end and the said control screw at the bottom, there being associated with said motor and epicyclic reduction gear having a toothed first end wheel connected to said column and a second end wheel rotatable on said column which is connected to said control screw. The positioning device of the tool-carrying body includes at least one annular guide, essentially an annular recess, formed in the inner surface of the hollow body transversely of the axis of the turret and interrupted in at least one region of its circumference by a toothed element or radial notch, a pre-loaded spiral spring being located in said annular recess and having their opposite ends interposed between each radial toothed element and a tooth projecting radially from the control screw. Extending into the interior of said annular recess, said tooth projecting from the screw is interposed stably between a toothed element present in the recess and the end of the spring so that, when said screw rotates in one direction, it stresses the spring until the tool-carrying body is locked. Upon rotation in the opposite direction, the tooth of the screw allows the said spring to be partially unloaded until the tool-carrying body is disengaged from the base while passing from one position to the other. The tool-carrying body is also provided with at least one latch or the like, displaceable on guides opposite the pre-loaded spring, and adapted to penetrate into recesses formed in the fixed base in order to arrest the tool-carrying body when the latter has reached the new position, this locked position remaining stable during the reversal of the rotation of the screw which lowers the tool-carrying body and locks it in the toothed crown of the base whereas said spring is subsequently loaded or stressed. For the stability of the engagement of the screw, I further provide an electro-magnetic brake acting directly on the motor.

More particularly the device according to the present invention has a rigid coupling arrangement between the screw and its nut effective only in one direction, i.e. the direction of feeding the tool-carrying body. During the rotation, the tool-carrying body (and the nut connected thereto) is elastically connected to the control screw by means of said springs. Furthermore, there are provided circular blocks or sectors, in order to permit the projecting teeth of the screw to press uniformly on the springs even when the tool-carrying body is raised relative to the screw, said sectors being interposed between the plane of the tooth of the screw and the helicoidal spring and displaceable within annular recesses.

Figure 2:
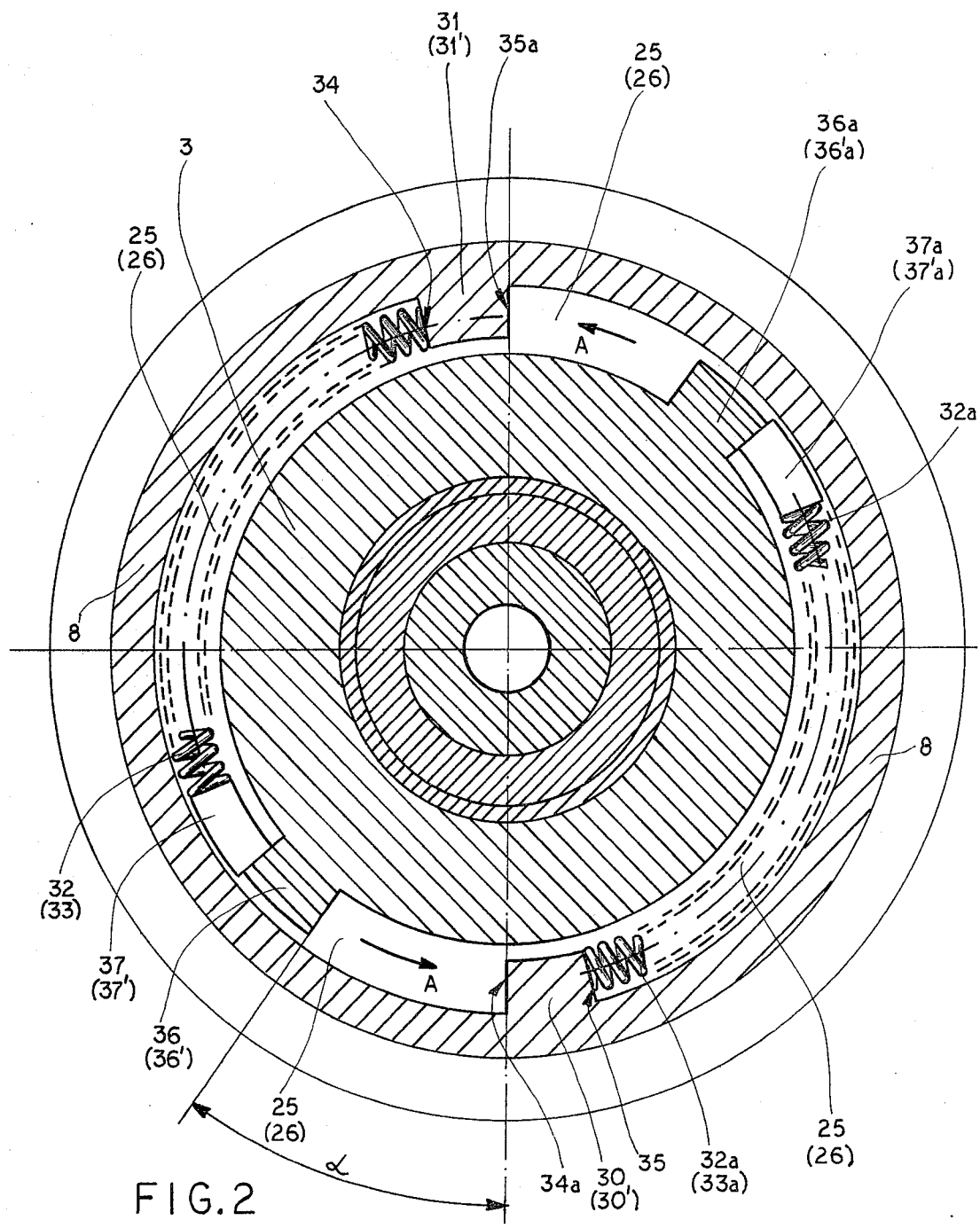

The above and other features of my invention will be described further, by way of example, with reference to the accompanying drawing in which:

FIG. 1 is a half axial diametral section of a tool-carrying turret symmetrical about its axis, said tool carrier incorporating a positioning device according to the invention; and FIG. 2 is a cross-section through the tool-carrying body incorporating the positioning device, taken on the line II—II of FIG. 1.

With reference to the drawing, and in particular to FIG. 1, a tool-carrying turret incorporating a positioning device according to the invention comprises a fixed base 1 to which there is connected a central column 2. A control screw 3 is rotatably mounted by a bearing 4 on the column 2 so as to be axially nondisplaceable relative to the turret, the screw 3 being enclosed between two opposing thrust bearings 5 and 6. A nut 7 or like threaded member, which is connected to a tool-carrying body 8 of known type, is mounted in engagement with the screw 3. If the screw 3 has, for example, a left-hand thread, rotation of the screw in counterclockwise direction accordingly causes the tool-carrying body to rise and become disengaged from base 1, but if the screw rotates in clockwise direction, the tool-carrying body 8 is lowered and becomes locked on the base 1. This locking is obtained, as is well known, by means of two identical toothed crowns 9, 10 opposed to each other, one crown being formed on the base 1 and the other on the bottom of the tool-carrying body 8. At least one latch 11, displaceable between guides formed axially in the tool-carrying body, is disposed so as to remain in contact with the base 1, under the action of a compression spring (not shown), during the rotation of the tool-carrying body, and to enter into recesses or notches 12 with its free end when the tool-carrying body has reached its new position. As many notches 12 are formed in the base 1 as there are working positions provided for the tool-carrying body 8. The latches 11 have on their free ends, in well known manner, a straight side parallel to the turret axis and an opposite inclined side. With such a construction the latch is free to exit from the notches—which also have a straight side and an inclined one, for sliding along said inclined surfaces—thus leaving the tool carrier free to rotate. Conversely, the latch is retained by engagement of the straight sides or flanks with each other when the tool-carrying body, having reached a new working position, has to move, without rotating, towards the base until said two base crowns 9, 10 are in engagement with each other.

A shaft 13 is keyed centrally on the column 2 and on its top there is mounted a stator 14 of an electric motor 15 of the hollow-rotor type which is rotatable co-axially with the shaft itself. A support flange 16 connected to said rotor 15 and also guided on said shaft 13 supports the central pivot 17 of an epicyclic reduction gear having satellites 18a, 18b in engagement with toothed end wheels 19 and 20. The first of these wheels (19) is connected to the shaft 13 by means of a grooved section or the like 13a and the second is mounted to rotate about the shaft on the bearing 21.

The upper satellite 18a is of smaller diameter than the lower satellite 18b and the lower toothed wheel 20 of the reduction gear is rigidly connected by arms or flanges 22 to the tip of the control screw 3; by such connection, rotation of the motor positively rotates the screw itself. An electromagnetic brake 23 is associated with the motor and has an armature 24 which is connected to the hollow rotor 15 by means of elastic plates 24a. The positioning device of the tool-carrying body 8 comprises two annular recesses 25 and 26 (FIGS. 1 and 2) disposed one above the other and formed in the inner surface of body 8; said two recesses are substantially defined by two annular projections 27 and 28, which are parallel with each other, and by a plane ring 29, horizontally forming part of the tool-carrying body 8 itself.

The annular recesses 25 and 26 are each interrupted (FIG. 2) by two radial notches or projections 30, 31 (30' and 31' for the recess 26) located in diametrically opposite positions. These projections are integral with the tool-carrying body (in FIG. 2 only the recess 25 is shown, but it is intended that the recess 26 should be identical therewith). Thus, for each recess 25, 26 two half recesses, divided by the said radial projections 30, 31, are formed and in each half recess there is disposed a spring 32 and 32a for the two halves of the recess 25, and 33—33a for the two halves of the recess 26 below it. Inserted within each half recess 25, 26 are diametriclly opposite teeth 36, 36a for the recess 25 and 36'—36'a for the recess 26, which teeth project radially from the screw 3 and have a thickness in an axial direction less than the depth of each recess 25, 26, the difference being greater than the axial displacement to be imposed on the tool-carrying body 8 for disengaging it from the base teeth 9, 10. As is shown in FIG. 2, a spring 32, 32a is disposed within the two half recesses 25 and has one end which rests on the respective sides 34, 35 of the projections 31, 30 of body 8 and the other end is supported on blocks 37, 37a in an arc of a circle, in turn bearing against the teeth 36, 36a of the screw 3. The springs 32, 32a are initially tensioned, even when they are at their maximum possible length within the recess and between the said supports.

The same arrangement is used for the lower recess 26, the references of which are indicated in brackets in FIG. 2.

The blocks 37, 37a of the recess 25 (and also the blocks 37', 37'a of the recess 26) are provided to improve the contact between the teeth 36 (36') and 36a (36'a) and the associated springs in that, as stated, the teeth are less in thickness than the depth of the associated recesses for permitting axial movement of the tool-carrying body for the disengagement from and engagement with the crowns 9, 10.

When the teeth 36, 36a (36', 36'a) which are connected to the screw 3, execute, together with the screw itself, a rotary movement of amplitude "$a$" (FIG. 2), a corresponding axial movement of the nut 7 occurs and hence of the tool-carrying body 8 connected thereto, which movement is sufficient to raise the body to the extent necessary to disengage the toothed crown 9 from the base crown 10 and hence to free the tool-carrying body or, alternatively, to lock it with the engagement of the two crowns with each other. If the screw 3 has a left-hand thread, the raising of the tool-carrying body and hence the disengagement thereof from the fixed base (disengagement of the crown 9 from the crown 10) causes a rotation of the screw in counterclockwise direction, according to the arrow A, the amplitude of which is, as stated, of the angular value "$a$".

The operation of the positioning device according to the present invention is as follows: starting from the situation of a locked turret, as shown in FIG. 1, in which the tool-carrying body can pass from one working position to the next, it is first necessary to disengage the electro-magnetic brake 23 and then to energize the motor. Rotation of the motor 15 causes rotation of the satellites 18a, 18b of which the one having the smaller diameter (18a) engages with the fixed end wheel 19, and therefore the other end wheel 20 is urged to rotate with reduced speed and in the same direction of rotation as the motor 15—thus rotating the screw 3 to which it is connected. If the helix of the control screw 3 is a left-hand thread, the rotation of the motor in counterclockwise direction rotates the screw 3 initially in the same direction causing disengagement of the tool-carrying body 8 from the base, since the screw 3 first effects a rotation corresponding to the angle "α" (rising angle). This movement also causes a partial unloading of the springs 32, 32a (33, 33a) until the notches 36, 36a (36', 36'a) come into contact with the thrust surfaces 34a, 35a of the teeth 30, 31 within the recess 25 (similarly for those within the recess 26). As a result of this angular displacement of the screw 3 and the consequent unlocking of the tool carrier, the latter is now free to rotate and the said teeth 36, 36a (36', 36'a) already in contact with the teeth 30, 31 (30', 31') of the tool carrier are rotated towards the new working position. When this new working position is reached, one or more latches 11 retain the tool-carrying body against the fixed base. In known systems the rotation of the motor is therefore reversed and a tool-carrying body, which can no longer rotate, is lowered by the screw 3 which, being urged to rotate in a direction opposite to the preceding direction, i.e. clockwise, travels the annular path "alpha", simultaneously compressing the springs within the associated recesses—as shown in FIG. 2. When the tool carrier is locked to the base, the motor 15 is stopped and the electro-magnetic brake 24 then comes into action. With this positioning arrangement, any tendency on the part of the tool-carrying body to advance upwardly relative to the screw for known reasons is opposed by the torque created by the action of the springs and, in practice, the springs are preferably dimensioned so as to give a torque to oppose the permitted unbalancing twisting moment. The presence of the electro-magnetic brake locks the screw itself in the working position, thus preventing the springs (which are loaded in this manner) from tending to rotate it in counterclockwise direction A. Furthermore, when the tool-carrying body is rotated together with the screw 3, no power is lost since, during the locking rotation (clockwise direction), the motor, in addition to furnishing the necessary torque for the nut and screw locking, is also obliged to supply the torque necessary for pre-loading the said spring with the consequence that the motor must have considerable power. This is made possible in accordance with my present invention, given the same amount of space as in conventional systems, by the feature that the particular arrangement of the reduction gear permits the employment of a motor having a hollow rotor. Conversely, in the unlocking phase, there is provided a torque which is equal to the sum of the torque of the motor plus that produced by the springs. This results in a further advantage since in known apparatus of this type it is necessary, in order to ensure reliable disengagement of the turret, to act in such manner that the ratio between the locking torque and the unlocking or disengaging torque is raised by having recourse to suitable devices such as, for example, that of underfeeding the motor during the locking phase or increasing the pitch of the screw so that it is practically reversible; this, however, is obtained automatically with the turret according to the present invention, as stated above. Furthermore, there is achieved the effect of elastically opposing any rebounding of the tool carrier whenever the established position is voluntarily or accidentally exceeded. Obviously, structural modifications and variation of an equivalent nature may be applied to the above-described invention, in a practical embodiment without departing from the scope of the invention as defined in the appended claims.

I claim:

1. An automatic turret for a lathe and the like, comprising a fixed base, a control screw mounted to be rotatable and axially non-displaceable, a nut connected to a tool-carrying body, two basic toothed crowns and at least one latch for arresting the tool-carrying body, a central column supporting a hollow-rotor motor at its upper end and said control screw at the lower end thereof, an epicyclic reduction gear associated with said motor and having an initial end toothed wheel fixed to said column and a second end wheel rotatable on said column and connected to said control screw, a positioning device of the tool-carrying body comprising at least one annular guide recess provided on the inner cylindrical surface of the body, co-axial with the axis of the turret and interrupted on its circumference at at least one point by at least one radial element, the said annular recess also being provided with at least one tooth projecting radially from the control screw, and at least one pre-loaded spring interposed so as to penetrate within said annular recess between said tooth projecting from the screw and one flank of said element present in the recess; said tooth of the screw being capable of traveling an angular path within said recess of the tool carrying body corresponding to the axial movement for the disengagement of the body from the base in which path the said spring is partially unloaded, the said tool-carrying body being, after disengagement, rotated directly by said tooth until reaching the new working position, and being provided with at least one latch which slides on guides and is adapted to penetrate into the base so as to arrest the tool-carrying body when it has reached the new position, this arrest remaining stable during the reversal of the rotation of the screw adapted to lower the tool-carrying body until locking the basic toothed crowns and reloading said spring interposed in said recess, the stability of locking of the screw being ensured by an electro-magnetic brake acting directly on the motor.

2. A turret as claimed in claim 1, in which two annular recesses are provided within the tool-carrying body and adjacent to each other, each of which recesses is internally interrupted at at least two points by means of two radial elements disposed in diametrically opposite positions.

3. A turret as claimed in claim 1, in which the angular displacement of the radial teeth of the screw within the recesses, so as to load the associated springs in the locking phase of the tool-carrying body, is sufficient to allow them to slide in the unlocking phase corresponding to a location of the control screw, in both directions, as necessary for the lowering and raising, relative to the fixed base, of the tool-carrying body and for the complete locking or unlocking thereof.

4. A turret as claimed in claim 1, in which between each radial element and the end of the associated spring there is interposed a circular block, freely displaceable within the annular recess, for distributing the thrust of the tooth of the screw on the springs in a correct manner during the axial displacements of the tool-carrying body relative to the rotatable, axially nondisplaceable screw.

5. A turret as claimed in claim 1, in which said control screw is directly controlled by the motor by means of said epicyclic reduction gear.

6. A turret as claimed in claim 1, in which the torque furnished by the said springs is such as to oppose the admissible unbalancing moment for the turret.

7. A turret as claimed in claim 1, in which, in the unlocking phase of the turret, the action of the said preloaded springs is added to that of the motor, increasing the power ratio relative to the locking phase inorder to ensure the unlocking of the tool-carrying body.

8. A turret as claimed in claim 1, in which in rotation the control screw is in direct contact with the tool-carrying body in the phase for the return to the working position, whereas it is in elastic contact therewith during the locking and unlocking phases with said crowns.

* * * * *